US012290872B2

(12) United States Patent
Schröder et al.

(10) Patent No.: US 12,290,872 B2
(45) Date of Patent: *May 6, 2025

(54) ELEMENT SUPPLY APPARATUS FOR A SETTING WELDING DEVICE, AN ELEMENT NEST AND A RETROFIT KIT FOR THE SETTING WELDING DEVICE AS WELL AS CORRESPONDING SUPPLY METHODS OF A WELDING AUXILIARY JOINING PART

(71) Applicant: BÖLLHOFF VERBINDUNGSTECHNIK GmbH, Bielefeld (DE)

(72) Inventors: Dennis Schröder, Herford (DE); Bernd Haesler, Halle (DE); Kilian Doedtmann, Bramsche (DE); Stefan Rehling, Bückeburg (DE); Sergej Hartwig-Biglau, Hiddenhausen (DE); Wilhelm Westermann, Bielefeld (DE); Oliver Schienstock, Delbrück (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 4 days.

This patent is subject to a terminal disclaimer.

(21) Appl. No.: 18/541,056

(22) Filed: Dec. 15, 2023

(65) Prior Publication Data

US 2024/0139855 A1    May 2, 2024

Related U.S. Application Data

(63) Continuation of application No. 17/158,273, filed on Jan. 26, 2021, now Pat. No. 11,883,900.

(30) Foreign Application Priority Data

Jan. 29, 2020 (EP) .................. 20154411

(51) Int. Cl.
  B23K 11/31  (2006.01)
  B23K 11/11  (2006.01)
  B23K 37/02  (2006.01)

(52) U.S. Cl.
  CPC .......... B23K 11/315 (2013.01); B23K 11/115 (2013.01); B23K 11/318 (2013.01); B23K 37/0211 (2013.01)

(58) Field of Classification Search
  CPC .. B21J 15/32; B23K 11/0053; B23K 11/0066; B23K 11/11; B23K 11/115;
  (Continued)

(56) References Cited

U.S. PATENT DOCUMENTS

2017/0216957 A1* 8/2017 Hartwig-Biglau .................. B23K 11/0066

* cited by examiner

Primary Examiner — Chris Q Liu
Assistant Examiner — James F Sims, III
(74) Attorney, Agent, or Firm — Reising Ethington P.C.

(57) ABSTRACT

An apparatus of a setting welding device for an auxiliary joining part with a head and a shaft, includes a linear drive fastenable at the setting device and including an element nest at a movable end, in which an auxiliary joining part is releasably receivable from a transfer unit. The element nest is movable by the linear drive in a first direction. The element nest is supported in a floating manner, and is positionable via a mechanical stop alignment in abutment with an electrode punch in the joining direction below the electrode punch. And/or the element nest is connected with the linear drive via a mechanical direction-changing coupling component so that the element nest is movable by the linear drive in a second direction so that the auxiliary joining part is positionable at the joining location, wherein the second direction is not parallel to the first direction.

3 Claims, 12 Drawing Sheets

(58) Field of Classification Search
CPC ..... B23K 11/315; B23K 11/318; B23K 11/36; B23K 37/0211; B23K 37/047; B23P 19/001; B23P 19/006; F16B 2/245; F16B 5/08
USPC ...................................................... 219/86.24
See application file for complete search history.

ELEMENT SUPPLY APPARATUS FOR A SETTING WELDING DEVICE, AN ELEMENT NEST AND A RETROFIT KIT FOR THE SETTING WELDING DEVICE AS WELL AS CORRESPONDING SUPPLY METHODS OF A WELDING AUXILIARY JOINING PART

CROSS REFERENCE TO RELATED APPLICATIONS

This application is a continuation of U.S. patent application Ser. No. 17/158,273 filed Jan. 26, 2021 and claims the priority of European patent application No. EP20154411.1, filed on Jan. 29, 2020. The entire contents of these priority applications are incorporated herein by reference in their entireties.

TECHNICAL FIELD

The present disclosure is related to an element supply apparatus of a setting welding device for a welding auxiliary joining part with a head and a shaft. Furthermore, the present disclosure relates to an element nest of a welding auxiliary joining part for a setting welding device as well as to a setting welding device that is equipped with the element supply apparatus and/or the mentioned element nest. Furthermore, the present disclosure relates to a retrofit kit of an element supply apparatus as well as of an element nest for an existing setting welding device. Furthermore, supply methods of a welding auxiliary joining part to a joining location in a setting welding device are defined. For this purpose, the respective supply method uses the above-mentioned element supply apparatus and/or the element nest.

BACKGROUND

In the state of the art, different setting welding devices are known which are supplied with welding auxiliary joining parts via element supply systems that are partly very complex. The element supply systems are partly complex in this connection because the ways between a transfer unit for the welding auxiliary joining part and the joining location must be bridged with the help of several drives. It is furthermore necessary that the positioning of the element supply apparatus must be secured both at the transfer unit for the welding auxiliary joining part as well as at the joining location for transferring the welding auxiliary joining part to the electrode punch with sufficient sensor technology.

In this connection, DE 10 2017 112 448 A1 discloses a setting welding device which is characterized by a constructively complex transfer and supplying of a welding auxiliary joining part. In this setting welding device, firstly, a welding auxiliary joining part is transferred from a clamp arrangement to a second clamp arrangement before the welding auxiliary joining part is supplied to the joining location. This requires two complex clamp constructions that are adapted or adjusted to each other in terms of sensor technology and drives. Complex because the sensors and drives of the clamp itself must safeguard the transfer of each welding auxiliary joining part. As the transfer of the welding auxiliary joining part takes place away from the joining location under the electrode punch, several drives are furthermore necessary for a transfer to the joining location. These drives act into at least two different movement directions. This requires the necessary control electronics, sensor technology and installation space for drives and sensor technology which overall have a negative effect on the interfering contour of the setting welding device.

In WO 2017/048912 A1, the welding auxiliary joining part is directly blown to an electrode nest under the electrode punch. This construction is based on the precise alignment of the element nest at the end of the profile channel to the element punch. For this purpose, the profile channel has a large interfering contour. Furthermore, the profile channel with its interfering contour must be positioned in a fit manner, in order to bring the element nest under the electrode punch. It is furthermore necessary that the profile channel be removed from the electrode punch before a welding connection can be established. In order to realize the precise positioning of the element nest under the electrode punch and for the regular moving of the element supply into the direct proximity of the electrode punch and to a sufficient distance to the electrode punch, a complex and precisely adapted sensor technology and drive technology is also necessary. Because neither the element nest itself nor the profile channel connected with it allow the compensation of tolerances in the course of the alignment between electrode punch and welding auxiliary joining part.

EP 3 199 288 A2 discloses a setting welding device with an element nest which places the welding auxiliary joining part precisely under the electrode punch. After that, the welding auxiliary joining part is carried along with the electrode punch and clamped at the component. The feeding of the welding auxiliary joining part takes place directly into the element nest. The positioning of the element nest under the electrode punch is free of tolerances so that a sufficient securing by sensors and drives must take place. Wears of the electrode punch are compensated by driving the element nest with the welding auxiliary joining part against the bottom side of the electrode punch. The subsequent moving of the electrode punch and the element nest does, however, also require a high effort in terms of adjustment and control.

With regard to the plurality of supplying constructions and systems of setting welding devices that are known in the state of the art, it is the object of at least some implementations of the present disclosure to provide a simpler element supply apparatus with a more efficient constructive effort and control effort.

SUMMARY

The above object is solved by an element supply apparatus of a setting welding device for a welding auxiliary joining part with a head and a shaft. Furthermore, the above object is solved by an element nest of a welding auxiliary joining part in a setting welding device, which may be in an element supply apparatus of a setting welding device. Moreover, the above object is solved by a setting welding device for a welding auxiliary joining part with a head and a shaft in combination with the above-mentioned element supply apparatus as well as in combination or in combination, respectively, with the above-mentioned element nest. Furthermore, the present disclosure comprises a retrofit kit for an element supply apparatus or an element nest. Moreover, in connection with the element supply apparatus which has already been mentioned above, a supply method as well as a supply method of a welding auxiliary joining part for a setting welding device in combination with the above-mentioned element nest is disclosed. Further embodiments and modifications are set forth in the following description, the accompanying drawings as well as the appending claims.

The element supply apparatus of a setting welding device for a welding auxiliary joining part with a head and a shaft comprises the following features: a linear drive which is fastenable at the welding setting device and which has an element nest at a movable end, in which element nest a welding auxiliary joining part is receivable in a releasable manner, in particular from a transfer unit, and the element nest is movable via a linear movement of the linear drive into a first movement direction at least to a joining location of the welding auxiliary joining part, wherein according to alternative 1, the element nest is supported in a floating manner in a plane that is approximately perpendicular to a joining direction in order to be positionable via a mechanical stop alignment in abutment to an electrode punch in the joining direction below the electrode punch, and/or wherein according to alternative 2, the element nest is connected with the movable end of the linear drive via a mechanical, direction-changing coupling component so that by means of the linear movement of the linear drive into the first movement direction, the element nest is movable into a second movement direction, so that the welding auxiliary joining part is positionable at the joining location, with the second movement direction being oriented at an angle unequal 0° and unequal 180° to the first movement direction.

The element supply apparatus aims at simplifying the construction of known setting welding devices with regard to the element supply. In this connection, the simplification refers to the use of sensor technology, drive technology and necessary interfering contour in order to firstly receive a welding auxiliary joining part from a transfer unit and to subsequently supply it to the joining location in an effective manner With regard to this superordinate theme, the element supply describes two alternative approaches which can be used on their own or in combination with one another. For this purpose, both alternatives 1 and 2 principally cooperate with at least a linear drive that can be fastened at the welding setting device. According to a further design, the use of only one linear drive is sufficient for realizing a reliable element supply to the joining location. Nevertheless, it is also conceivable, too, that the element nest, that is described in more detail below, be supplied to the joining location with the combination of, for example, two linear drives, too.

The element nest is movably arranged at a movable end of the linear drive, particularly at the operating end of the linear drive. The use may be limited to only one linear drive, this linear drive moves the element nest into a first movement direction which is specified by the linear drive. The element nest has a certain pre-orientation so that in this element nest, the welding auxiliary joining part can be received with its longitudinal axis being aligned approximately parallel to the later joining direction. The element nest is furthermore supported in a plane that is approximately perpendicular to the joining direction in a floating manner. This floating support opens up a tolerance-afflicted supply of the welding auxiliary joining part, that is received in the element nest, to the joining location. In this context, tolerance-afflicted means that despite a precise arrangement of the welding auxiliary joining part below the electrode punch, certain deviations between a longitudinal axis of the welding auxiliary joining part and a longitudinal axis of the electrode punch may be present. That means in particular, that the welding auxiliary joining part does not necessarily have to be arranged co axially to the electrode punch. The floating support of the element nest does, however, guarantee that with an effective, direct or indirect contact between the element nest and the electrode punch, a coaxial alignment between the welding auxiliary joining part and the electrode punch may take place. With this specific alignment between the welding auxiliary joining part and the electrode punch, the subsequently following establishing of the joining location is prepared.

It can be recognized from the above-described context that due to its contact with the element nest, the electrode punch is able to relocate and align the element nest within the floating support such that a coaxial arrangement between the welding auxiliary joining part and the electrode punch arises. This interaction requires neither an additional sensor technology for recognizing the position of the element nest and/or the electrode punch nor any additional drives in order to act towards a precise coaxial alignment of the welding auxiliary joining part below the electrode punch. In this regard, the merely constructive solution achieves an efficient positioning of the welding auxiliary joining part below the electrode punch without any additional electronic control effort or drive effort.

According to a further alternative 2, which is implemented on its own or in combination with the above-discussed element nest according to alternative 1, the element nest is connected with the movable end of the linear drive via a mechanical, direction-changing coupling component. The designation mechanical, direction-changing coupling component first of all emphasizes that with it, a deviation of the movement direction of the element nest from the first movement direction of the linear drive is realized. For this purpose, it is neither necessary to combine a further linear drive with the first linear drive. Rather, movable parts are interconnected in a way that with the aid of the only one linear movement of the linear drive, the element nest with the welding auxiliary joining part to be supplied can be moved into a second movement direction, too.

For this purpose, the element nest may be supported in a linearly or rotatorily movable manner, wherein this linear movement direction is unequal to the movement direction of the linear drive. It may furthermore be preferred that the linear drive be connected via the direction-changing coupling component with the element nest in its linear-movable support. This coupling component is connected with the linear drive and the element nest via corresponding fastening points, which may be fastening pivots, in a rotatable manner. Furthermore, there is a third fastening point, such as in the form of a fastening pivot or fastening pin, which also serves as a rotation point for this coupling component. This rotation point lies outside a connection line between the two fastening points to the linear drive and the element nest, so that with the help of the direction-changing component, a linear movement of the linear drive is convertible into another movement direction, in particular a linear movement, of the relocatable or movable element nest.

In this connection, it is significant that the direction-changing component be constructed such that the linear movement direction of the linear drive and the movement direction of the element nest be aligned according to the direction-changing component at a certain angle to each other, which is unequal 0° and unequal 180°. According to further design alternatives, both, in particular linear, movement directions, enclose an obtuse angle.

According to a further design of the element supply apparatus according to the second alternative, which uses the mechanical direction-changing coupling component, the direction-changing coupling component comprises a rotatably arranged coupling lever which is connected with the linear drive and the element nest at two fastening points that are spaced from one another and the lever being fastened rotatably at a third fastening point, with the third fastening point lying outside an imagined connection line between the first and the second fastening point.

According to the above description, the direction-changing coupling component may be configured similar to a knee lever link or toggle joint. In this connection, it is, however, of significance that the direction-changing coupling component servers for the transfer of a linear movement and for the conversion of the movement direction of this linear movement to another movement direction. The coupling component is not designed for the purpose of realizing a change of torque or a change of force by the coupling component. Rather, the coupling component should guarantee in a loadable and reliable manner that with the only one linear movement of the only one linear drive, a delivery movement of the element nest into a second movement direction can be realized. Because in this way, a relatively position-precise arrangement of the welding auxiliary joining part under the electrode punch is provided with the only one linear drive, without any additional sensor technology and drive technology.

As has already been indicated above at various passages, the element supply apparatus of the embodiment may be realized with only one linear drive. Because this single linear drive is sufficient for reliably supplying the element nest to the joining location, even if for this purpose, linear movements that are arranged angularly to each other should be necessary.

According to a further embodiment of the element supply apparatus in combination with the above-mentioned alternative 1 of the first design or according to one of the preceding designs, the element nest comprises two element jaws that are arranged opposite to one another and spring relative to one another, with which the welding auxiliary joining part can be held releasably and which are supported in a floating manner in a plane perpendicular to the joining direction of the welding setting device.

From known setting welding devices, element nests are already known in which the welding auxiliary joining part to be supplied is held between element jaws. For the most part, these element jaws are movable via lever connections such that they can hold or release again the welding auxiliary joining part in a scissor-like or caliper-like way. For such a construction, it is of course necessary to use a targeted drive technology and most of the time sensor technology, too. In order to simplify this construction, the element nest uses two springing element jaws which are movable with respect to one another in a springy manner. This means that either only one element jaw is supported in a springy manner or that both element jaws can spring in order to hold a welding auxiliary joining part in a clamping manner or to release it, too. This construction guarantees, for example, that at a transfer unit, a welding auxiliary joining part can be clamped between the element jaws. Thus, the welding auxiliary joining part is held reliably between the element jaws for the further transport way or the delivery way, respectively, to the joining location. In the same way, this springing support of the welding auxiliary joining part between the element jaws that are supported in a springy manner relative to one another realizes that in case of a clamping of the welding auxiliary joining part between the electrode punch and a component, the element nest can be moved off from the welding auxiliary joining part. Thus, a simple releasing of the welding auxiliary joining part from the element nest is possible due to the springily supported element jaws.

According to a further design of the element nest or the element supply apparatus described in the previous paragraph, the element nest includes a contour piece as the mechanical stop alignment, with the contour piece having an abutment contour face that is adapted to an outer form of an electrode punch or generally adapted to a stop, wherein particularly a face normal of the abutment contour face is oriented perpendicularly to the joining direction of the electrode punch.

With the aim to reduce the sensory recording effort of the element supply compared with solutions in the state of the art, the element nest may include a contour piece which is relocatable or movable with an abutment contour face against the electrode punch or against a stop of a provision unit. This conception of the element nest requires a certain adjustment of the movement of the element nest to the position of the electrode punch, it is, however, not necessary that the distance between the moving element nest and the approximating electrode punch be recorded permanently with sensors. Rather, the abutment contour face of the contour piece of the element nest serves for realizing that the element nest be laterally moved against the electrode punch of the setting welding device. As soon as the abutment contour face laterally abuts the electrode punch, the further delivery movement of the element nest is stopped.

While on the one side, the contour piece with the abutment contour face serves for positioning the element nest directly at the electrode punch, it also serves for aligning the welding auxiliary joining part that is located in the element nest in a matching manner with respect to the longitudinal axis of the electrode punch, which may be coaxially to it. Because for a damage-free moving of the element nest against the electrode punch with the help of the contour piece, the contour piece may be floatably supported into the direction perpendicular to the electrode punch. In this way, the abutment contour face can be brought into contact reliably with the lateral face of the electrode punch without damaging the electrode punch. Because even if the linear delivery movement of the element nest and thus of the contour piece to the electrode punch allowed a movement exceeding the outer surface of the electrode punch, the contour piece could dive into its holder in the element nest against a spring tension due to the floatable support. Thus, this floating support may provide the contour piece with an additional freedom of movement in a plane that is arranged approximately perpendicularly to the joining direction of the setting welding device or to the longitudinal axis of the electrode punch.

In order to guarantee an optimal and precise abutment of the contour piece at the electrode punch, the abutment contour face of the contour piece is adapted to the outer lateral form, such as to the radial outside of the electrode punch. Accordingly, a face normal of the abutment contour face extends perpendicularly to the joining direction or to the longitudinal axis of the electrode punch.

According to a further design of the previously described element nest, the element jaws are fastened at the contour piece laterally in a springy manner and the contour piece is arranged into at least two, or three, directions within a plane perpendicular to the joining direction in a springy, deflectable manner.

Reference to the design or fastening of the contour piece in the element nest has already been made above. This includes that the contour piece is supported in a floating manner in a plane approximately perpendicular to the joining direction or to the longitudinal axis of the electrode punch. For this purpose, the contour piece can dive into the fastening in the element nest for a certain spring way and be pushed out again by means of the spring force. As the contour piece is moved perpendicularly into the direction of the electrode punch, this springing support of the contour piece results in a floating support in a plane approximately perpendicular to the joining direction and to the longitudinal axis of the electrode punch. As the springing element jaws are now also fastened at the contour piece, the floating support of the contour piece may have a similar effect on the element jaws, e.g. when receiving the welding auxiliary joining part or when transferring the welding auxiliary joining part to the electrode punch adjacent to the joining location. The contour piece may be held laterally in a springy manner. This lateral spring enables an additional deflection of the contour piece and thus of the element jaws in the plane perpendicular to the joining direction or to the longitudinal axis of the electrode punch. In this context, laterally refers to the delivery direction of the element nest to the electrode punch. Consequently, the floating support of the contour piece and thus also of the element jaws within the approximately perpendicular plane to the joining direction and to the longitudinal axis of the electrode punch may comprise two degrees of freedom. According to a further design, it is also possible that the contour piece may move within the plane into three directions such that it compensates tolerances.

According to a further design of the element supply apparatus, in particular in combination with the alternative 1 of the element supply, a downholder is arranged upstream at the movable end of the linear drive for the element nest into a delivery direction to an electrode punch of the welding setting device, with which downholder the movement of the element nest can be converted into the second movement direction through an abutment of the downholder at a component and through a further movement of the linear drive.

The element supply apparatus may be operated with only one linear drive. This linear drive is equipped with the mechanical, direction-changing coupling component that has already been described above, so that even with the only one linear movement of the linear drive, the movement direction of the element nest can be specifically changed into another movement direction. The downholder may rest on the component to be connected in case of the linear movement of the linear drive. On the one side, this movement is used to close the still present clearance between at least two components to be connected. Because through the linear movement and the driving force of the linear drive, the downholder applies the closing forces necessary for this purpose onto the components that may be arranged in a piled manner upon one another.

When the downholder may be subject to a predetermined counter force when resting on the components to be connected with one another, the mechanical, direction-changing coupling component is induced to make a movement which induces a relocating or displacing of the element nest into another movement direction compared with the linear drive. This second movement direction may also be a linear movement which runs parallel to the component surface. Because the downholder may remain in contact with the component surface during this second linear movement of the element nest. According to further embodiments, the downholder is not moved during the second linear movement, in particular because it is fastened at the slide of the linear guide, or it is shifted to the electrode punch. This second linear movement that is caused by the downholder resting upon the component guarantees that the contour piece of the element nest is movable in abutment with the electrode punch.

The movement into the second movement direction, i.e. the inducing of the mechanical direction-changing coupling component, may be realized by overcoming a spring force within the mechanical, direction-changing coupling component. The movement of the element nest in the second movement direction is finished when the welding auxiliary joining part is positioned under the electrode punch and at the same time, the contour piece abuts laterally at the electrode punch. This position is the prerequisite that the electrode punch clamps the welding auxiliary joining part at the opposite component so that the element nest can be taken off or moved away, respectively, from the welding auxiliary joining part.

According to a further design of the element supply apparatus, the element nest is guided along a linear guide, which guarantees a delayable movement of the element nest parallel to the first movement direction of the linear drive, in order to change the movement of the element nest from the first movement direction into the second movement direction.

According to a further design, the element nest is guided on a linear guide. This is for example possible by means of a slide. While adjacent to the joining location, the resting of the downholder may cause a change of direction of the movement with the help of the direction changing coupling component, this is realized for example adjacent to a transfer unit for a welding auxiliary joining part by stopping or blocking the element nest on the linear guide. Because a blocking of the further straight movement of the element nest on the linear guide may cause an inducement of a rotation of the direction changing coupling component such that the element nest is again moved into the other movement direction compared with the linear drive. Provided that such a blocking is realized adjacent to the transfer unit, the element nest is specifically delivered to a transfer unit in order to be able to provide the still free element nest with a welding auxiliary joining part there.

Furthermore, the present disclosure includes an element nest of a welding auxiliary joining part in a setting welding device, which may be in an element supply apparatus of a setting welding device, with the element nest being supported in a plane approximately perpendicularly to a joining direction of the welding setting device in a floating manner, in order to be positionable via a mechanical stop alignment in abutment to an electrode punch of the setting welding device in the joining direction below the electrode punch.

For this purpose, the element nest may include two element jaws that are arranged opposite one another and spring relative to one another, with which the welding auxiliary joining part can be held in a releasable manner and which are supported in a plane perpendicular to the joining direction in a floating manner.

According to a further design of the element nest, the element nest includes a contour piece as the mechanical stop alignment, having an abutment contour face that is adapted to an outer form of an electrode punch, wherein in particular, a face normal of the abutment contour face is oriented perpendicularly to the joining direction.

According to a further design of the element nest, the element jaws of the element nest are laterally fastened at the contour piece in a springy manner and the contour piece is arranged in a deflectable manner in at least two, or in three directions within a plane perpendicular to the joining direction.

The above summarized element nest has the same constructive features as are already described above in combination with the element supply apparatus. It may be, however, also preferred to combine this element nest with a setting welding device of the known construction without the above described element supply apparatus, in order to exploit its constructive advantages during the supplying of a welding auxiliary joining part to the electrode punch. For the functional description of the individual constructive designs of the element nest, reference is therefore made to the above description.

The present disclosure furthermore includes a setting welding device for a welding auxiliary joining part with a head and a shaft in combination with the above-described element supply apparatus or in combination with the above described element nest.

Furthermore, the present disclosure includes a retrofit kit of an element supply apparatus according to one of the above-described designs or a retrofit kit for the above-described element nest which can be connected with a setting welding device.

The above-described element supply apparatus as well as the individually described element nest can each be combined with existing setting welding device in order to improve the supplying of welding auxiliary joining parts there. Therefore, the element supply apparatus according to the above described designs as well as the element nest according to the above described designs realizes a retrofit kit for such existing setting welding devices.

Furthermore, the present disclosure includes a supply method of a welding auxiliary joining part to a joining location in a setting welding device with the above described element supply apparatus. This supply method comprises the following steps: delivering the occupied element nest with the linear movement of the linear drive in the first movement direction at least to a joining location of the welding auxiliary joining part, with the welding auxiliary joining part being releasably held by two element jaws of the element nest that are arranged opposite to one another and spring relative to one another, placing a downholder that is fastened at the linear drive onto a component and after that, moving the element nest via the mechanical, direction changing coupling component into the second movement direction for the purpose of positioning at the joining location by means of a further moving of the linear drive into the first movement direction.

According to a further design of the above mentioned supply method, the further steps are carried out: moving the element nest up against or into abutment with the electrode punch thereby causing the mechanical stop direction of the element nest to abut laterally at the electrode punch and the welding auxiliary joining part being held between the element jaws and positioned in the joining direction below the electrode punch, clamping the welding auxiliary joining part by means of the electrode punch in the joining direction against the adjacent component at the joining location, removing the element nest from the electrode punch and thereby releasing the welding auxiliary joining part from the springing hold of the element jaws.

According to a further design of the supply method and also of the above described element supply apparatus, a blocking of a movement of the element nest parallel to the first movement direction of the linear drive adjacent to a transfer unit for a welding auxiliary joining part and thereby a moving of the element nest via the mechanical direction-changing coupling component into the second movement direction into the direction of the transfer unit takes place for the purpose of positioning the element nest at the transfer unit through a further moving of the linear drive in the first movement direction.

Due to the combination of the linear drive with a linear guide for the element nest running parallel to it, it is possible to use the mechanical direction changing coupling component also at a transfer unit for a switching from the first movement direction of the linear drive to the second movement direction. In this way, not only the above already described specific supplying of the welding auxiliary joining part to a joining location is possible but also the specific supplying of the still free element nest to the transfer unit. As soon as this positioning adjacent to the transfer unit has been realized, the transfer unit can deliver a welding auxiliary joining part to the still free element nest. Insofar, the blocking of the moving of the element nest along the linear guide may cause a similar blocking and switching effect as the resting of the downholder on the component to be joined (see above). Because due to the stopping of the element nest, in particular due to the blocking of the further linear movement of the element nest, a force and movement is applied onto the direction-changing coupling arrangement by means of the further moving linear drive. After the overcoming of a threshold spring force, the linear drive moves the direction-changing coupling component about a fixed rotation point which leads to a movement of the element nest into a second movement direction. This second movement direction is, as has already been explained above, different from the first movement direction of the linear drive. In this context, different means that the first and the second movement direction are aligned at an angle to one another that is unequal 0° and unequal 180°. This means that due to the direction-changing coupling component, neither a movement parallel to the linear drive nor anti-parallel to the linear drive is induced.

According to a further design of the supply method, the further step is carried out: moving the element nest up against or into abutment with the transfer unit which causes the mechanical stop alignment of the element nest to abut at a stop of the transfer unit and causes the two element jaws that are arranged relative to each other in a springy manner to be positioned in a transfer position of the transfer unit, and after that, moving of a welding auxiliary joining part from the transfer unit between the element jaws of the element nest so that the welding auxiliary joining part is releasably held there.

While the direction changing coupling component realizes the delivery of the occupied element nest to the electrode punch, it can be used in the same manner to deliver the still free element nest to the transfer unit. Moreover, the contour piece, in its floating support at the element nest, is suitable for delivering the element nest in a non-destructive manner at direct proximity to the transfer unit and for positioning it there for a transfer of the welding auxiliary joining part. Insofar, the movement features of the element delivery can be used analogously at the transfer unit, as already used in combination with the electrode punch when delivering the welding auxiliary joining part to the joining location.

According to a further design of the supply method, a moving of the linear drive contrary to the first movement direction takes place in case of a blocked movement of the element nest parallel to the first movement direction, i.e. by a suitable blockage of the element nest at the linear guide parallel to the linear drive, which causes the element nest to be transferred back into an initial position via the mechanical direction changing coupling component contrary to the second movement direction, and after that delivering the occupied element nest to the joining location with the linear movement of the linear drive into the first movement direction.

Furthermore, the present disclosure includes a further supply method of a welding auxiliary joining part to a joining location in a setting welding device in combination with the above described designs of the element nest. This supply method comprises the following steps: delivering the occupied element nest with at least one drive to a joining location adjacent to an electrode punch, wherein the welding auxiliary joining part is releasably held by two element jaws of the element nest that are arranged opposite one another and spring relative to one another, moving the element nest up against or into abutment with the electrode punch which causes the mechanical stop alignment of the element nest to abut laterally at the electrode punch and the welding auxiliary joining part to be held and positioned between the element jaws in the joining direction under or below the electrode punch, clamping the welding auxiliary joining part by means of the electrode punch in the joining direction against the adjacent component at the joining location, removing the element nest from the electrode punch and thereby releasing the welding auxiliary joining part from the springing hold of the element jaws.

According to a further design of this supply method, a compensation of tolerances takes place in a plane approximately perpendicular to the joining direction between the electrode punch and the element nest when moving the element nest up against or into abutment with the electrode punch with the help of the floating support of the element nest with respect to a fastening.

BRIEF DESCRIPTION OF THE DRAWINGS

The designs of the present disclosure are explained in more detail with reference to the accompanying drawings. It shows.

DETAILED DESCRIPTION

Figure 1:
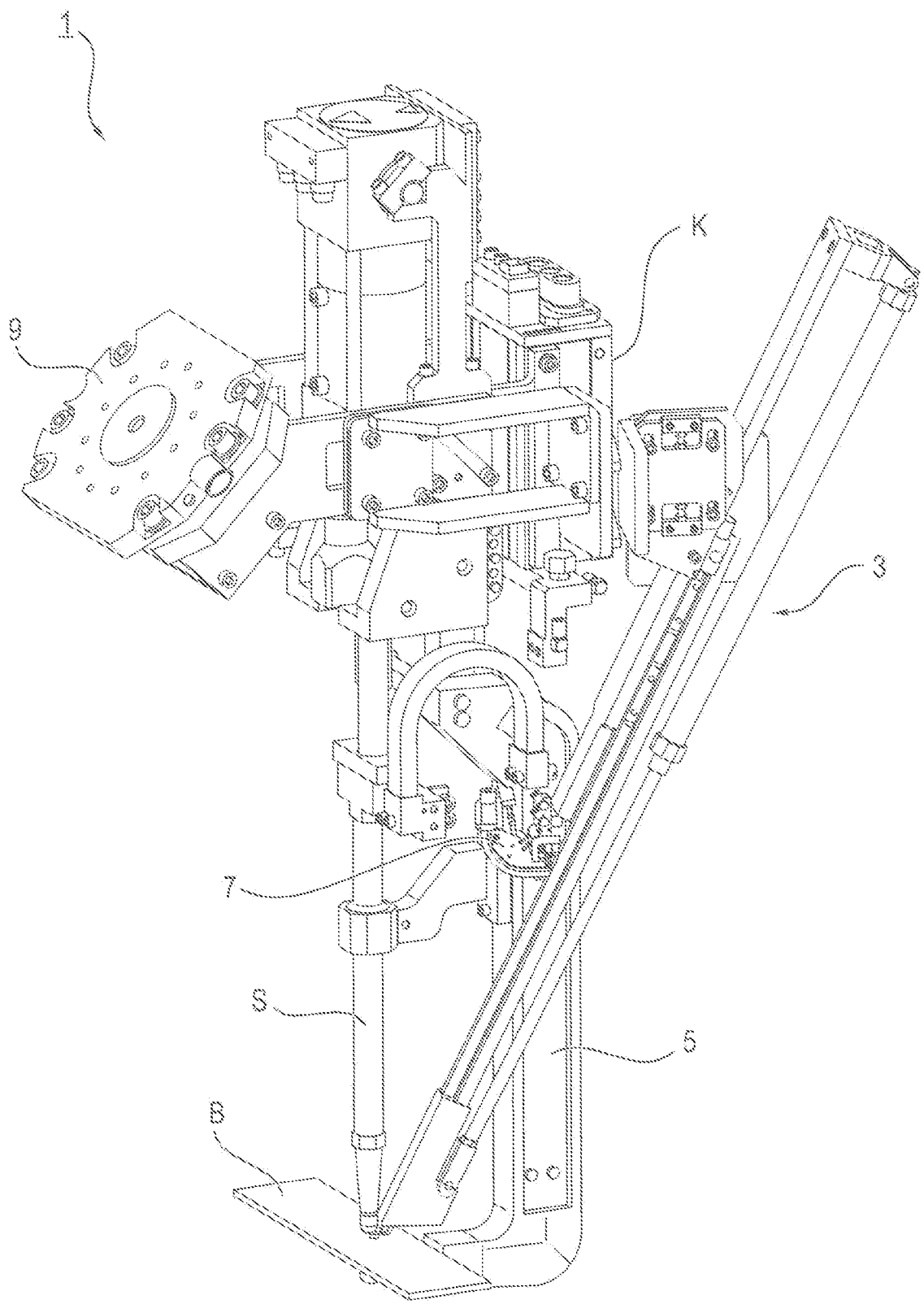
FIG. 1 a perspective lateral view of a setting welding device with an embodiment of an element supply apparatus, FIG. 2 a detail enlargement of FIG. 1, FIG. 3 an enlarged view of an embodiment of a section of the element supply apparatus, FIG. 4 an enlarged view of the element supply apparatus with element nest at the moved end of the linear drive, FIG. 5 an enlarged view of the moved end of the linear drive in combination with the connected element nest at a transfer unit of the setting welding device, FIG. 6 an enlarged view of an embodiment of the element nest, FIG. 7 a further view of the element nest according to FIG. 6 in connection with the moved end of the linear drive, FIG. 8 a resting of the element nest with downholder on a component adjacent to a joining location, FIG. 9 a further view of the delivering of a welding auxiliary joining part to a joining location with the help of the element nest and the moved end of the linear drive, FIG. 10 a schematic view of the interacting of a contour piece of the element nest with the electrode punch during delivering of a welding auxiliary joining part to a joining location, FIG. 11 an enlarged lateral view of the arrangement and orientation of the welding auxiliary joining part below the electrode punch with the help of the interaction between electrode punch as well as contour piece of the element nest, FIG. 12 a schematic view of a releasing movement of the element nest from the welding auxiliary joining part which is clamped between component and electrode punch, FIG. 13 a flow chart of an embodiment of a supply method for a welding auxiliary joining part to a joining location, and FIG. 14 a further embodiment of the supply method of a welding auxiliary joining part to a joining location.

FIG. 1 shows an embodiment of a welding setting device 1 with an element supply apparatus 3. The element supply apparatus 3 is arranged adjacent to the rear part of a C-bracket 5. Thus, the interfering contour of the setting welding device 1 adjacent to the components B to be connected with one another is decreased. Furthermore, the setting welding device 1 may comprise a transfer or providing unit 7 which is supplied with welding auxiliary joining parts. From there, the welding auxiliary joining parts are transferred to the element supply apparatus 3, such as individually, as is explained further below. Moreover, the setting welding device 1 comprises a known coupling unit 9 for connecting with a robot (not shown).

The element supply apparatus 3 may be connected via at least one clamping piece K or Shim with the setting welding device 1. The clamping piece K forms the basis for connecting the element supply apparatus 3 with setting welding devices 1 of different types of construction and size. Furthermore, it forms the basis for offering the element supply apparatus 3 as a retrofit kit (see below) and for combining it with available setting welding devices 1.

Figure 2:
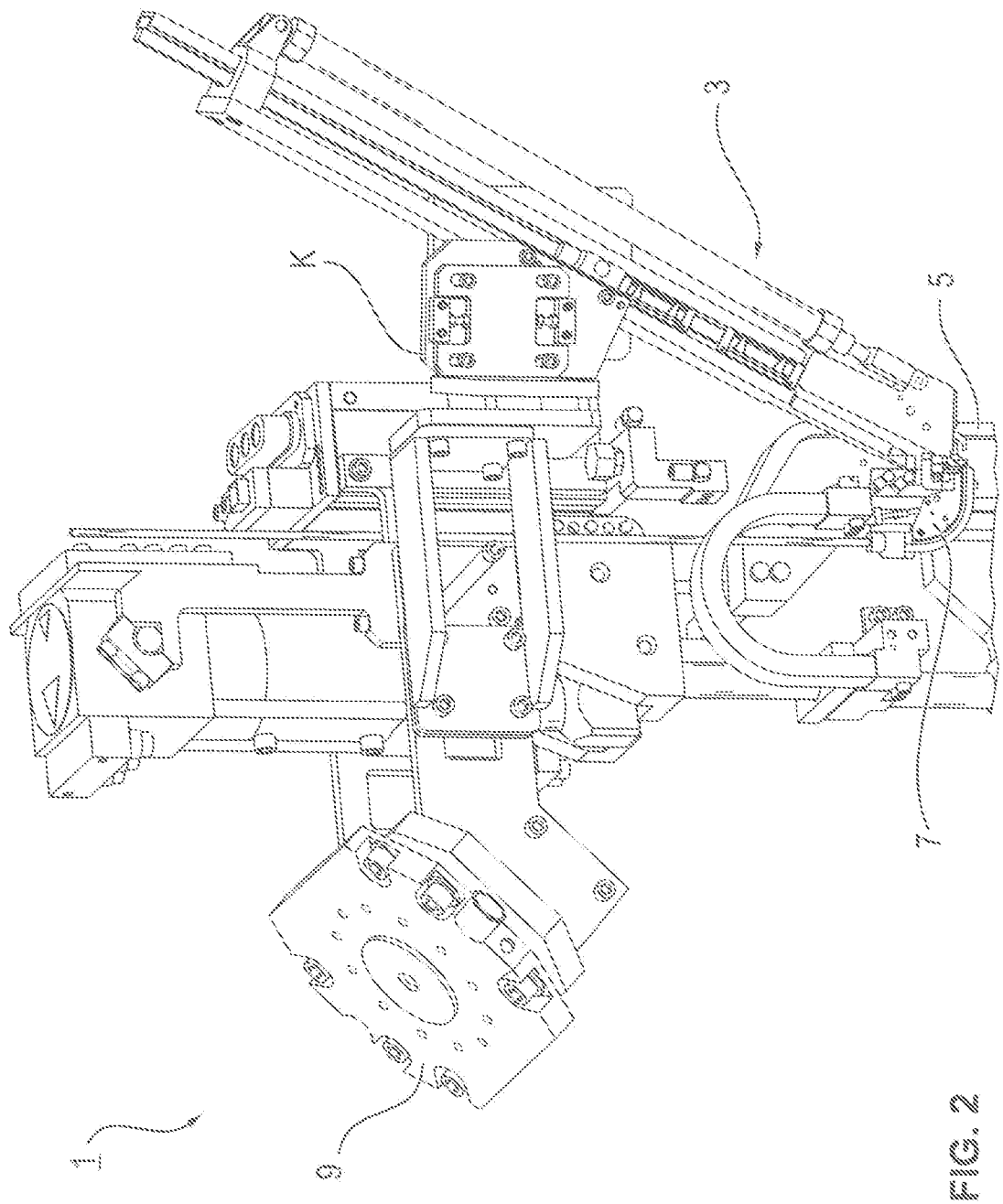

Beside the C-frame, which supports a counter electrode E, the setting welding device 1 comprises an electrode punch S or generally a welding electrode. The two designations electrode punch S and welding electrode refer to the same part of the setting welding device 1. This term is occasionally used in different ways in dependency of the setting force to be used for the welding auxiliary joining part, here, however, it should be used synonymously. Therefore, the electrode punch S serves as an element for applying a mechanical setting force onto the welding auxiliary joining part and as an electrode for applying an electric load onto the welding auxiliary joining part. In FIG. 2, an enlarged view of the setting welding device 1 is shown.

Figure 3:
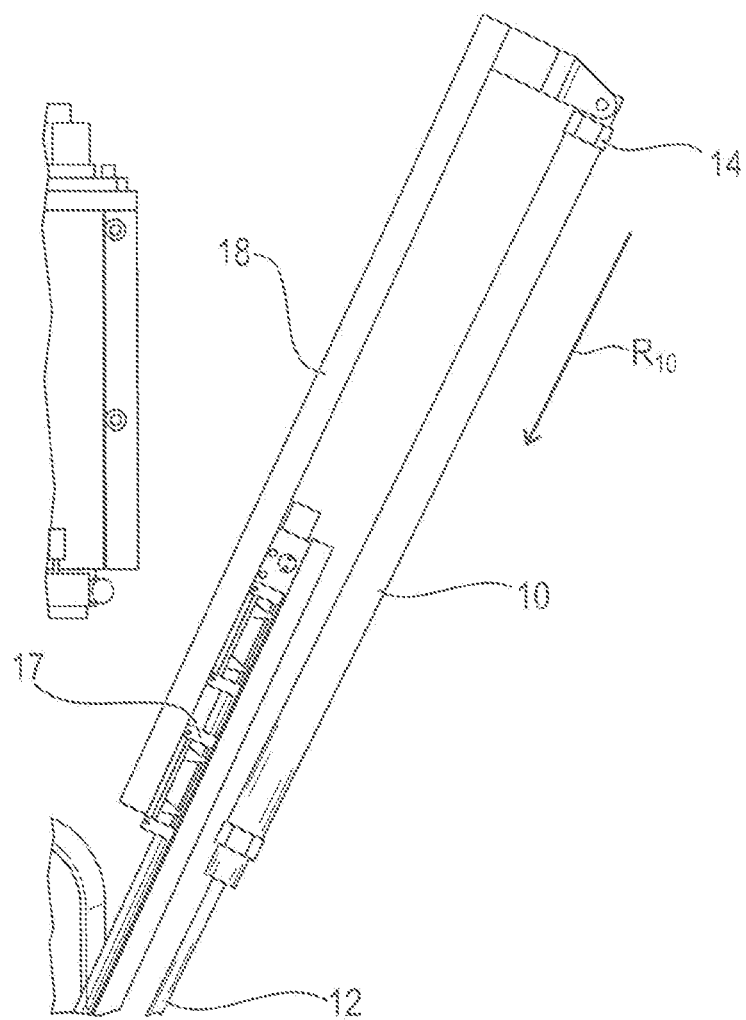
Figure 4:
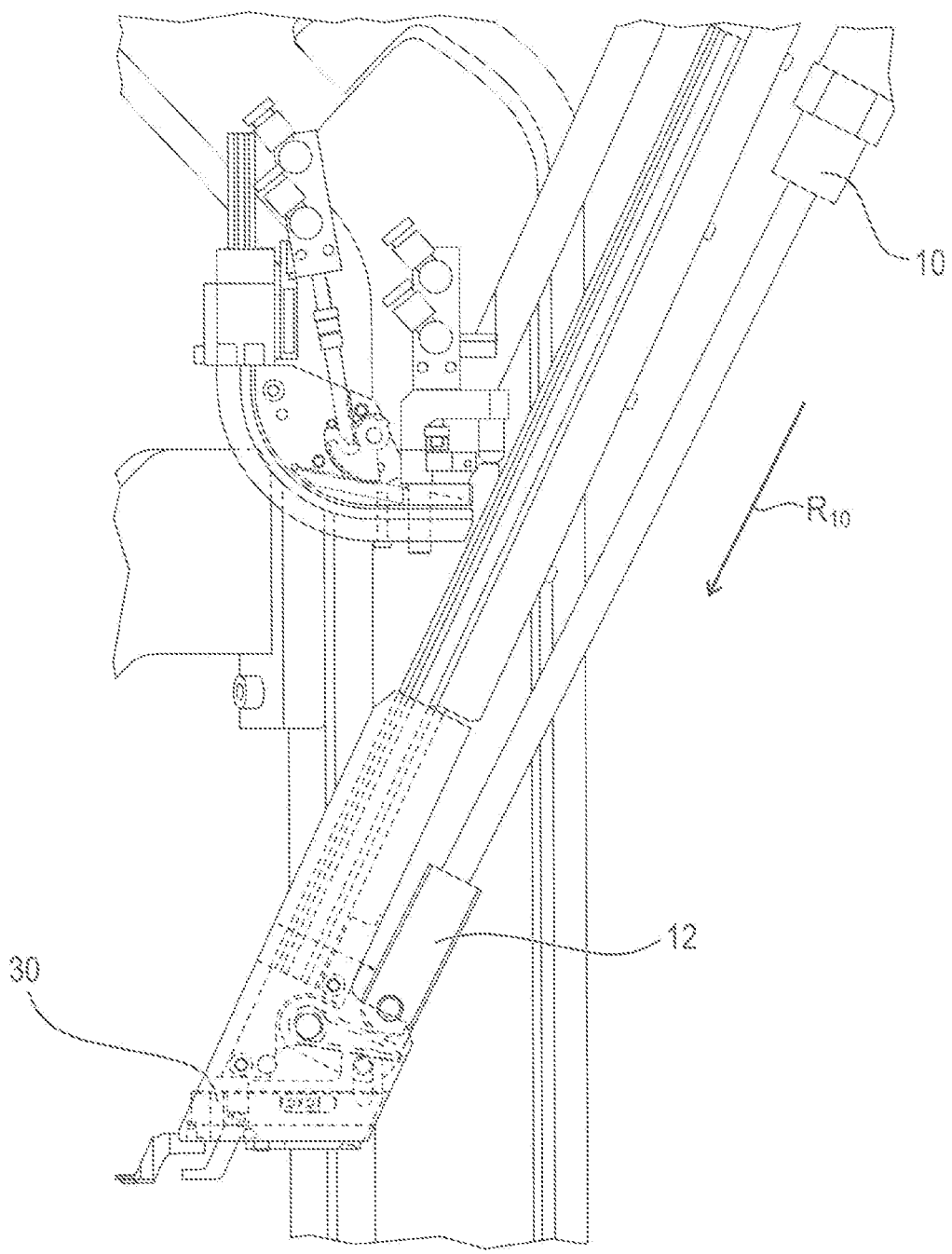

A further embodiment of the element supply apparatus 3 is illustrated in larger detail in FIGS. 3 and 4. The element supply apparatus 3 comprises at least one linear drive 10 with a movable end 12 and a fixed end 14. According to further embodiments, the linear drive 10 is a pneumatic cylinder, a hydraulic cylinder or a servomotor or generally any common actuator with which a change of length can specifically be generated. The linear drive 10 moves the moveable end 12 via its change of length into a first movement direction $R_{10}$ or contrary to it. This is illustrated with the arrow $R_{10}$ in FIGS. 3 and 4.

An element nest 30 is fastened at the moved end 12 of the linear drive. The element nest 30 serves for the receiving, the transporting and the transferring of a single welding auxiliary joining part 2 at a joining location (see below).

The element nest 30 is guided parallel to the linear drive 10 at a linear guide 16. For this purpose, the element nest 30 may be fastened at a slide 17 which runs on a rail 18. The slide 17 may be stopped and/or blocked in its movement on the rail 18. This design of the movement of the element nest 30 with the help of the linear guide 16 and the slide 17 may form a basis for realizing the functionality of the element supply apparatus 3.

It may be preferred that the element nest 30 that is described in more detail further below be moved with only one linear drive 10 for supplying a welding auxiliary joining part 2 to the joining location. In a combination with the linear guide 16, this may enable a reliable reaching of the joining location and of the transfer unit 7 for welding auxiliary joining parts 2. Furthermore, with the targeted use of only one linear drive 10, the effort for sensor technology and drive technology compared with known setting welding devices is reduced.

Figure 5:
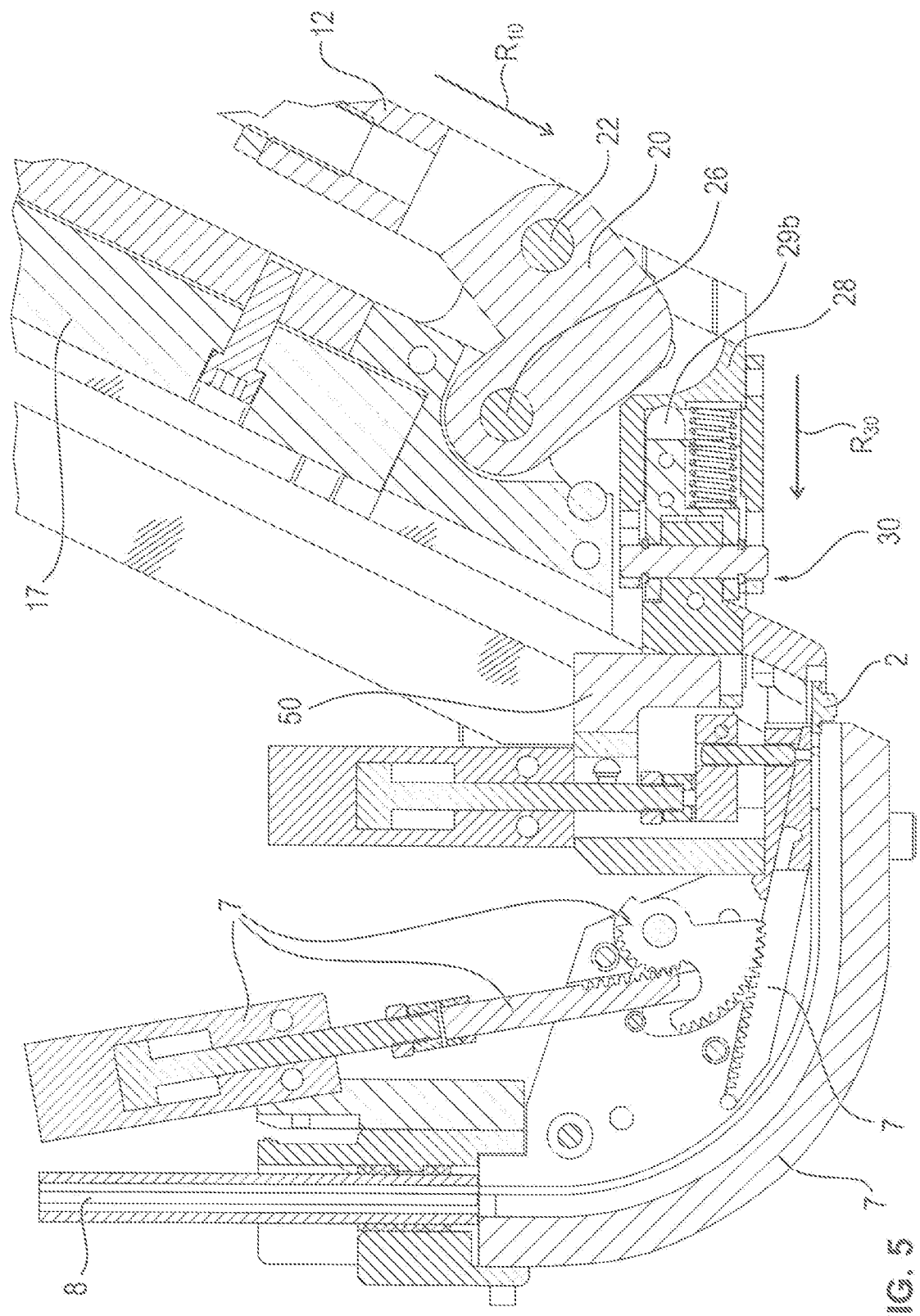

The element supply apparatus 3 in the configuration with only one linear drive 10 is illustrated in an enlarged form in FIG. 5. According to an embodiment, the welding auxiliary joining part 2 is blown to a transfer position via a profile tube 8 in the providing unit 7. A locking element may prevent the welding auxiliary joining part 2 from exiting the providing unit 7 in an uncontrolled way. As soon as the element nest 30 according to FIG. 5 is arranged adjacent to the providing unit 7, the welding auxiliary joining part 2 is moved into the element nest 30 with the help of a plurality of interacting levers and an activating actuator 6.

In order to arrange the element nest 30 adjacent to the transfer unit 7, the movable end 12 of the linear drive 10 may be connected with the element nest 30 via a mechanical, direction-changing coupling component 20. The coupling component 20 is a construction similar to a knee lever, each of which providing a fastening 22, 24, such as a fastening piston each, for the moved end 12 of the linear drive 10 and for the element nest 30. The coupling component 20 may be formed by a rotatably arranged coupling lever with the several fastening points.

Figure 8:
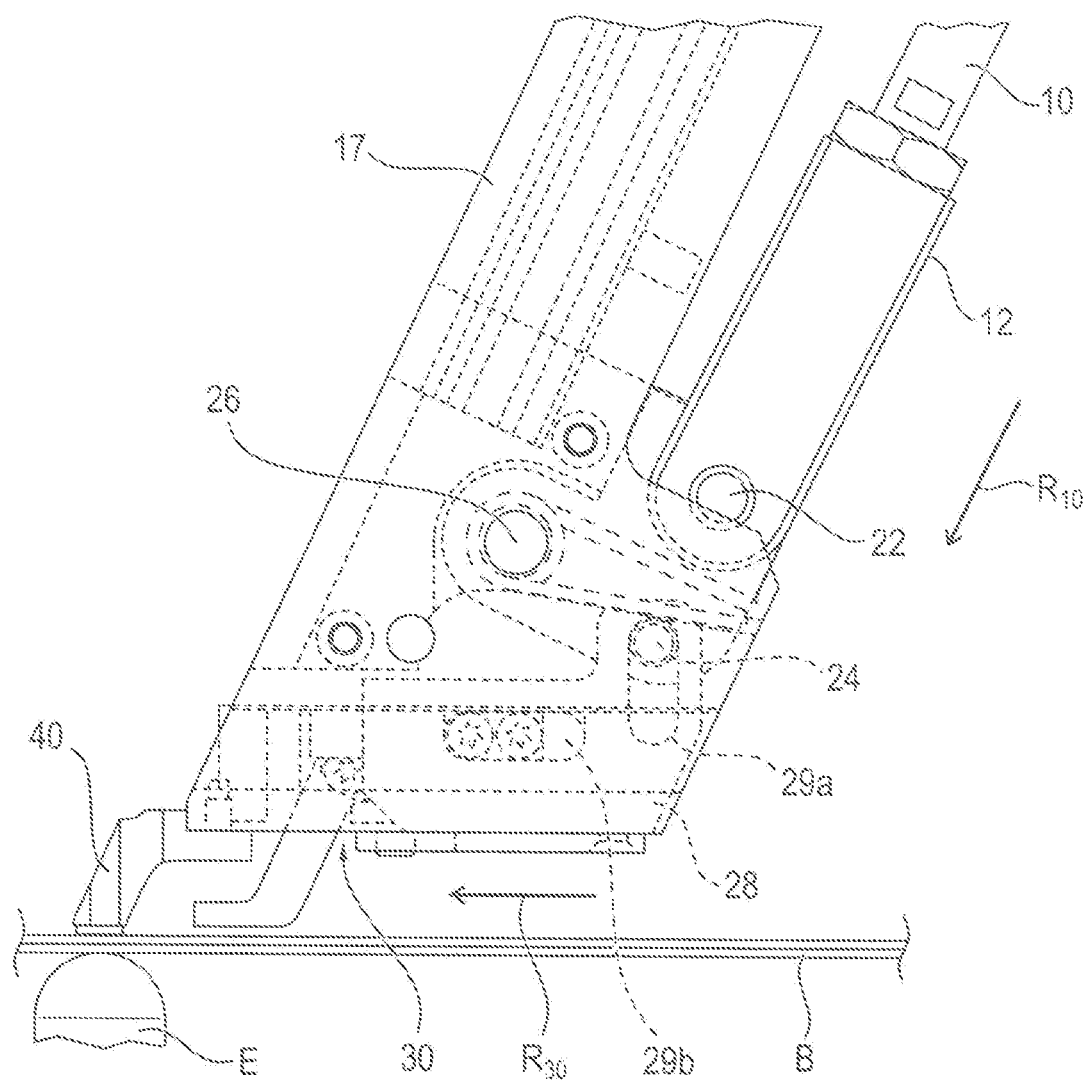

The fastening pistons 22, 24 allow a rotation of the interconnected components, relative to one another. Both fastening pistons 22, 24 (see FIGS. 5 and 8) may lie on a common line. Laterally to this imagined connecting line between the fastening pistons 22, 24, a further fastening piston 26 is provided at the slide 17 of the linear guide 16. The fastening piston 26 guarantees a rotating of the coupling component 20 about the fastening 26.

The coupling component 20 may be spring-preloaded against the moved end 12 of the linear drive 10. This means that only when the moved end 12 of the linear drive 10 reaches a threshold force during the movement into the first movement direction $R_{10}$, the coupling component 20 starts a rotation about the fastening 26. When comparing FIGS. 5 and 8, the rotation movement of the coupling component 20 becomes obvious. In order to actuate this rotation movement of the coupling component 20 about the fastening 26, the movement of the slide 17 of the linear guide 16 may be blocked. This makes the moved end 12 push against the coupling component 20 through the fastening 22, in order to rotate the coupling component 20 about the fastening 26 after reaching the threshold force. As the fastening piston 24 may be guided in a first long hole 29A of a connecting block 28 between the coupling component 20 and the element nest 30, the rotation of the coupling component 20 into the direction of the element nest 30 generates a movement or relocation of the element nest 30 away from the moved end 12 into the direction $R_{30}$ (see arrow in FIGS. 5 and 8).

The movement or relocation of the element nest 30 into the direction $R_{30}$ takes place in a second movement direction which differs from the first movement direction $R_{10}$ of the linear drive. This movement into the second movement direction $R_{30}$ may be caused by the linear drive 10 without an additional drive into the second movement direction $R_{30}$ becoming necessary.

While the rotation of the coupling component 20 is transferred onto the element nest 30 with the help of the connecting block 28 and the first long hole 29A, a second long hole 29B safeguards the movement direction $R_{30}$ of the connecting block 28 and thus of the element nest 30. For this purpose, at least one guide pen 32 of the element nest 30 engages into the second long hole 29B and allows only a movement of the element nest 30 into the course direction of the second long hole 29B.

Both movement directions $R_{10}$ and $R_{30}$ may be aligned to each other neither parallel nor anti-parallel. Rather, the two movement directions $R_{10}$ and $R_{30}$ enclose an angle unequal 0° and unequal 180°.

When delivering the element nest 30 to the providing unit 7 into the direction $R_{30}$, the slide 17 is decelerated in order to actuate the rotation of the coupling component 20 about the fastening 26, in particular a fastening pen or fastening piston. For this purpose, the moveable end 12 of the linear drive 10 moves into the direction $R_{10}$. After receiving a welding auxiliary joining part 2 by the element nest 30, the end 12 of the linear drive 10 may move contrary to the direction $R_{10}$ (see FIG. 5). Accordingly, the coupling component 20 makes a rotation about the fastening piston 26 in the opposite direction to $R_{30}$. The element nest 30 is moved back into its initial position adjacent to the moved end 12 of the linear drive 10, as is shown in FIG. 4.

An analogous movement of the element nest 30 is used for delivering the welding auxiliary joining part 2 to the joining location in the joining direction $R_F$ below the electrode punch S. As can be recognized from FIG. 8, in the initial position, the linear drive 10 delivers the element nest 30 into the direction $R_{10}$ to the components B. In the initial position of the element nest 30, the coupling component 20 may be spring-preloaded and has not yet been rotated into the direction of the element nest 30 about the fastening piston 26.

A downholder 40 may be arranged adjacent to the element nest 30 and upstream in the direction $R_{10}$ of the element nest. The downholder 40 may be fastened at the slide 17, which is guided by the linear guide 16. Due to the movement of the linear drive 10 into the direction $R_{10}$, the downholder 40 pushes onto the component B and blocks a further movement of the slide 17 and the element nest 30 into the direction $R_{10}$. The force which is applied by the downholder 40 onto the components B reduces or removes an existing clearance between the components B and thus prepares the establishing of a joining location.

The blocking of the further movement of the slide 17 by the downholder 40 corresponds with the blocking or decelerating of the slide 17 at the providing unit 7 (see above). When the linear drive 10 is extended in the direction $R_{10}$ also after the resting of the downholder, i.e. the end 12 continues to move into the direction $R_{10}$, the linear drive 10 overcomes the threshold force of the coupling component 20 and starts the rotation of the coupling component 20 about the fastening piston 26. In this way, the element nest 30 is relocated or displaced into the direction of the joining location above a lower electrode E (see FIG. 9).

The downholder 40 may be configured in a furcate way with two arms 42, 44. There is a free space between the arms 42, 44 into which the element nest 30 moves the welding auxiliary joining part 2 via the rotation of the coupling component 20 (see FIGS. 9 and 7).

Figure 10:
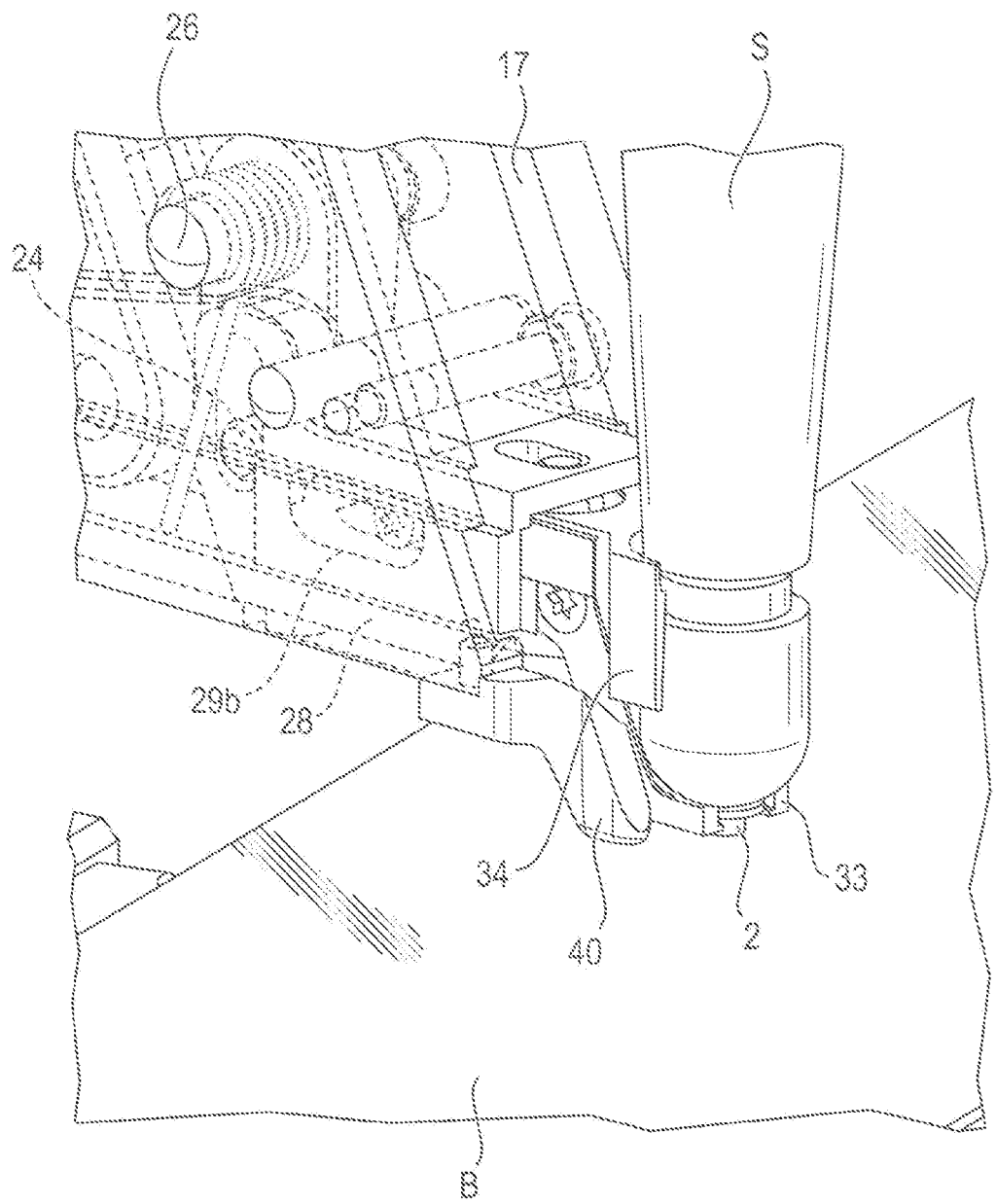

Subsequently, the welding auxiliary joining part 2 is clamped at the component 2 by the electrode punch S and is thereby held (see FIGS. 10 and 11).

Before the welding auxiliary joining part 2 is joined into the components B, the linear drive 10 shortens and moves the end 12 contrary to the direction $R_{10}$. By that, the coupling component 20 is rotated back into its initial position and the element nest 30 is removed from the electrode punch S, as can be seen from a comparison of FIGS. 11 and 12.

As the downholder 40 is not fixed by the electrode punch S, a further movement of the end 12 removes the element nest 30 from the component B. Accordingly, the welding setting process between the electrode punch S and the counter electrode E with the intermediary arranged welding auxiliary joining part 2 can be carried out.

In order to receive the welding auxiliary joining part 2 in an optimal way at the providing unit in the element nest 30 and to position it below the electrode punch S, the element nest includes a pair of springing element jaws 33 and a contour piece 34. The element jaws 33 are configured relative to each other in a springing way. For this purpose, the element jaws 33 preferably consist of a spring steel sheet. As the element jaws 33 are positioned opposite each other, they form a springing, thong-like arrangement in order to hold the welding auxiliary joining part 2 between themselves in a releasable manner. In order to support the hold of the welding auxiliary joining part 2 between the element jaws 33, the inner sides of the element jaws 33 which face each other have an inner contour that is adapted to the shape of the welding auxiliary joining part 2.

According to a further design of the element nest 30, the element jaws 30 are supported in a floating way in a plane that is approximately perpendicular to the joining direction $R_F$. Supported in a floating way means that the element jaws 33 can deviate joining locationly into the direction $R_S$ according to FIG. 6 in order to compensate possible alignment tolerances to, for example, the electrode punch S.

For this purpose, the element jaws 33 are connected with the contour piece 34. The contour piece 34 comprises an abutment contour face 35 which is discussed in more detail further below. The contour piece 34 is pivotably held in a coupling block 36 via a holding pen 37. The holding pen 37 runs through a furcate clearance in an approximately parallel way to the joining direction $R_F$. The contour piece 34 is arranged within the furcate clearance with a holding opening. Accordingly, the contour piece 34 can pivot about the holding pen 37 in the plane approximately perpendicular to the joining direction $R_F$ (see arrows $R_S$). The pivoting movement of the contour piece may be limited by spring sheets 38 that are arranged on both sides. They are fastened laterally at the coupling block 36 by means of pens 39 and reach up to the contour piece 34.

Beside the fastening of the spring sheets 38, the pens 39 also provide for a guiding of the element nest 30 in the long hole 29B of the connecting block 28.

Figure 6:
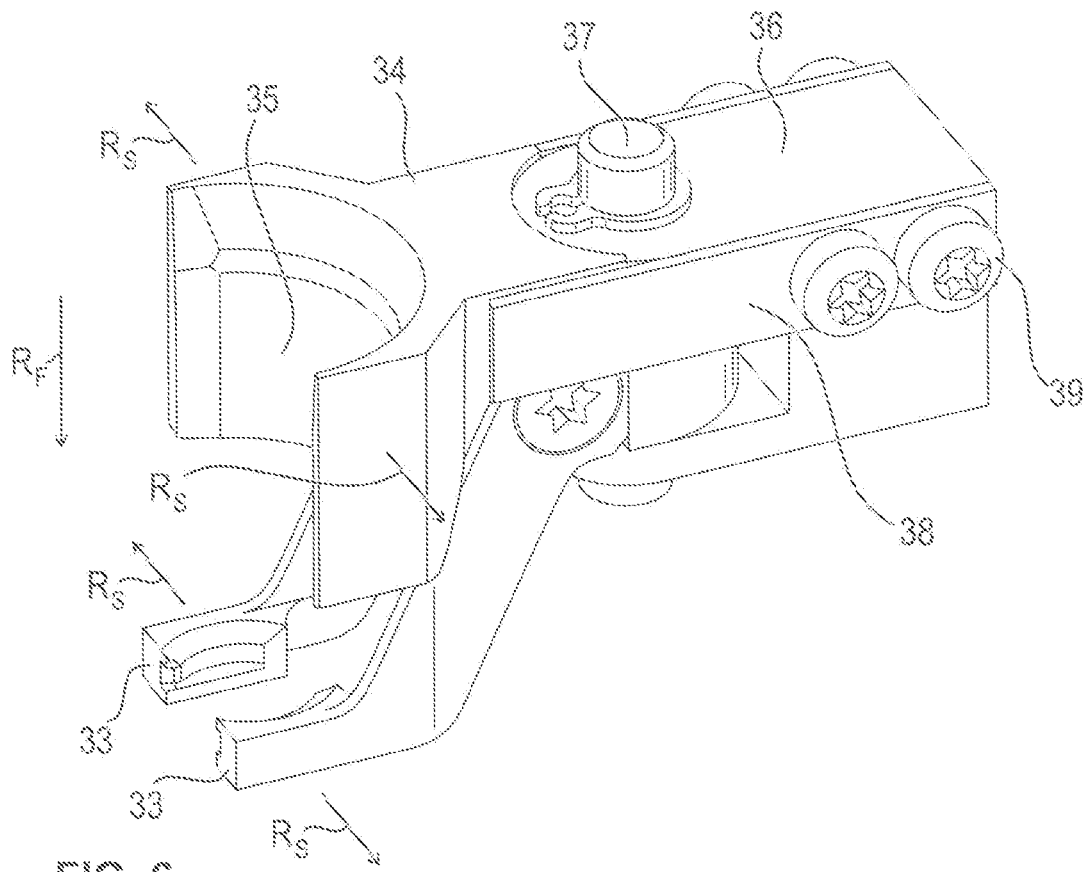

As can be recognized from FIG. 6, the element jaws 33 are fastened at the contour piece 34. Accordingly, the element jaws 33 are supported in the same floating way as the contour piece 34.

Figure 7:
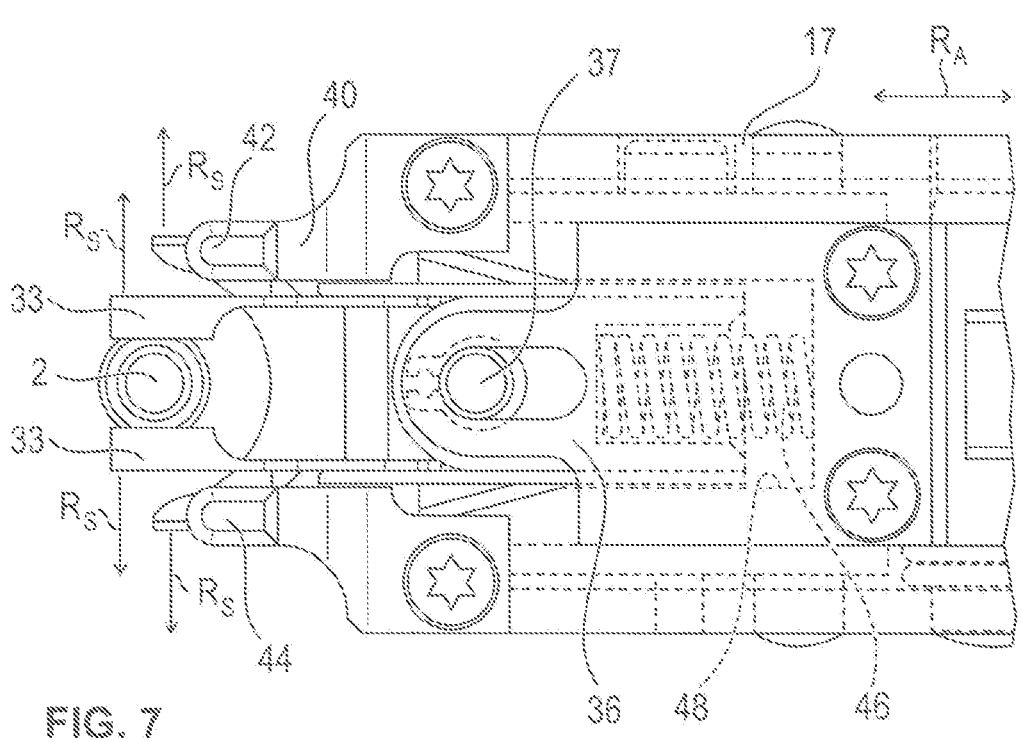

FIG. 7 shows a design of the element nest 30 in a view contrary to the joining direction $R_F$, i.e. from below. It can be recognized from there that the coupling block 36 is held in a recess 48 in a spring-preloaded way via a spring 46. This arrangement guarantees a compensation movement of the contour piece 34 and the element jaws 33 along the arrow R A in dependency of an action of force onto the contour piece 34. Thus, the element nest 30 may provide a floating hold of the welding auxiliary joining part 2 in the plane perpendicular to the joining direction $R_F$, which guarantees a tolerance compensation or deviation, respectively, of the welding auxiliary joining part 2 into three directions within this plane.

Based on the above-described embodiments of the element supply apparatus 3 alone or in combination with the element nest 30, the element delivery or supply in the setting welding device 1 with shortened cycle times and a low instrument-based effort with regard to sensors and drives can be realized. Because it may be possible with only one linear drive 10 to take over the welding auxiliary joining part 2 at the providing unit 7 and to subsequently supply it reliably to the joining location under the electrode punch S. It is precisely this effective delivery that is guaranteed by the only one linear drive 10 and the movement of the element nest 30 into the two different movement directions $R_{10}$ and $R_{30}$ via the direction-changing coupling component 20.

In addition to that or in combination of an existing delivery system of a welding setting device 1, the element nest 30 realizes a tolerance-compensating receiving of a welding auxiliary joining part 2 at the providing unit 7 and/or a tolerance-compensating arrangement or positioning of the welding auxiliary joining part 2 at the joining location below the electrode punch S. Because the floating support of the holding position of the welding auxiliary joining part 2 between the element jaws 33 in combination with the contour piece 34 constitute an effective preciseness when approaching the providing unit 7 and at the electrode punch S.

With respect to FIG. 5, the contour piece 34 moves against a stop 50 with its abutment contour face 35 at the providing unit 7. As the stop 50 aligns the contour piece 34 and thus the element jaws 33 through the floating support (see above), the element jaws 33 are positioned precisely for the takeover of the welding auxiliary joining part 2 in front of the providing unit 7. Accordingly, the welding auxiliary joining part 2 is then only transferred through the providing unit 7 between the element jaws 33 or is inserted there or clamped there. For this process, no sensor technology is necessary which monitors the exact positioning of the element nest 30 at the providing unit 7 or the presence of the welding auxiliary joining part 2 in the element nest 30.

Figure 9:
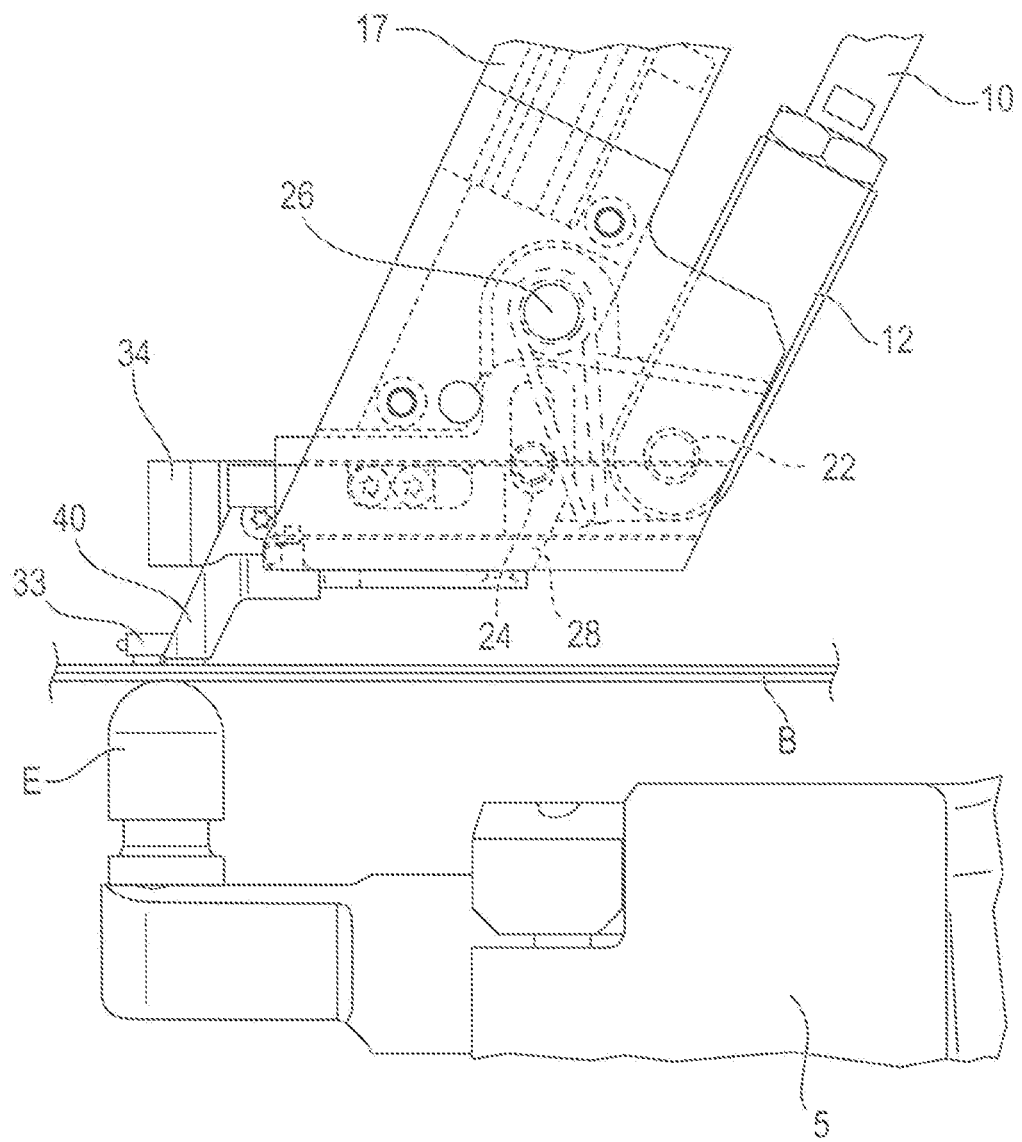

The positioning of the welding auxiliary joining part under the electrode punch S prior to the joining location process is also precise due to the construction of the element nest 30, in particular due to the floating support of the element jaws 33 in combination with the contour piece 34. The delivery of the welding auxiliary joining part 2 to the joining location may be carried out according to two different approaches. According to a first embodiment, which is illustrated in FIG. 9, firstly, the welding auxiliary joining part 2 is positioned approximately precisely above the counter electrode E. This position is, however, not necessarily sufficiently precise for subsequently carrying out the setting welding process with the electrode punch S. Instead, the electrode punch S is moved in the joining direction $R_F$ into the contour piece 34 and against the abutment contour face 35 in a next step. Due to the floating support of the contour piece 34 and of the welding auxiliary joining part 2 which is held by the element jaws 33, the welding auxiliary joining part 2 is aligned optimally with the electrode punch S and to the counter electrode E by means of the electrode punch S. Subsequently, the welding auxiliary joining part 2 is clamped by the electrode punch S at the component B, the element nest 30 is removed and the setting welding process is carried out.

Figure 11:
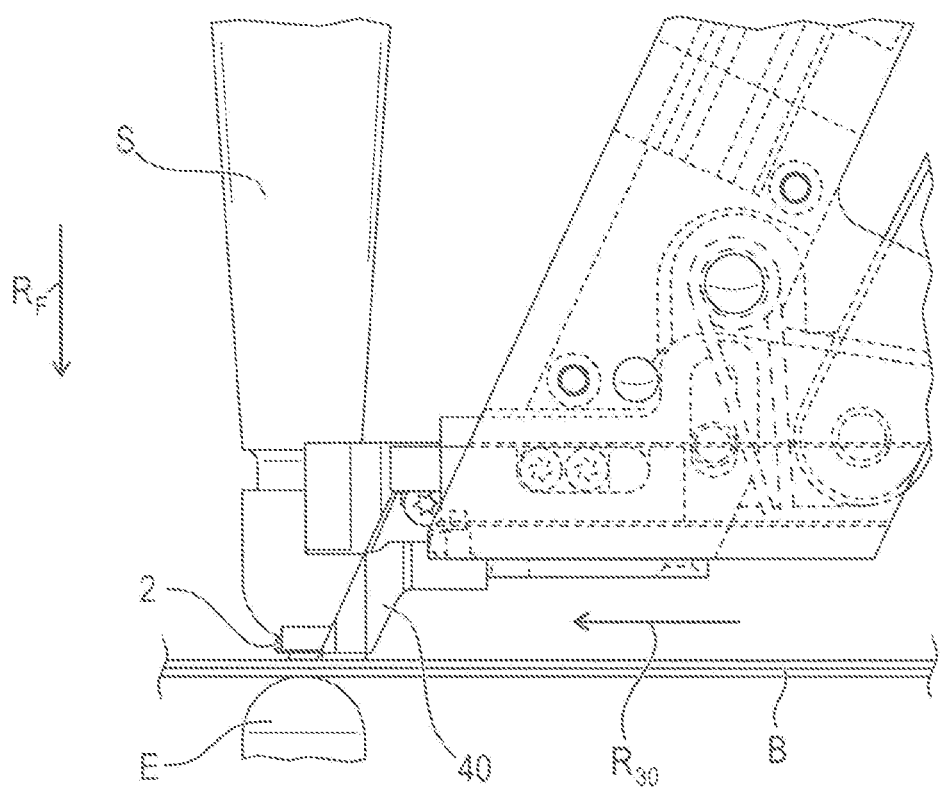
Figure 12:
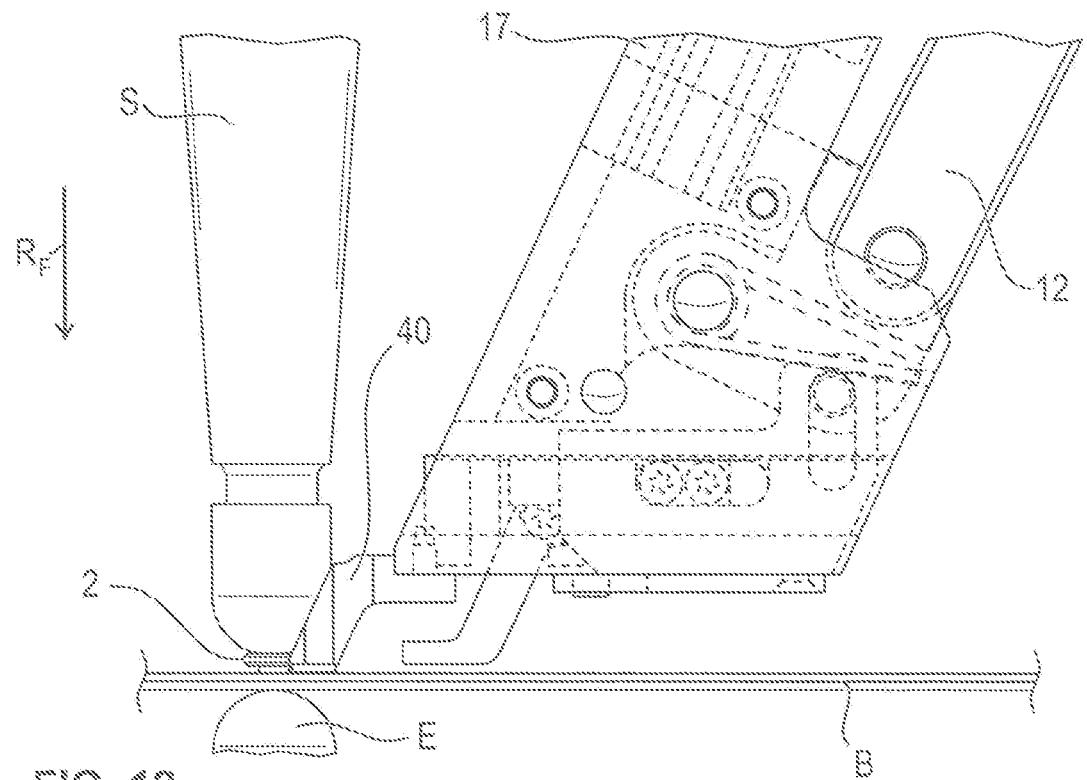

According to a further design, in FIG. 11, another positioning of the welding auxiliary joining part 2 under the electrode punch S is illustrated. Here, the electrode punch may be located in a position adjacent to the component B and thus to the joining location. Due to the combined movement of the linear drive 10 and the coupling component 20, the element nest 30 is moved into the direction R 30 to the electrode punch 20 until the contour piece 34 abuts the electrode punch S with the abutment contour face 35. As the abutment contour face 35 drives on full contact with the lateral surface or the outer surface of the electrode punch S, in particular of the radial outside of the same, the welding auxiliary joining part 2 is positioned via the floating support of the contour piece 34 precisely under the electrode punch S at the same time.

Subsequently, the electrode punch S moves into the joining direction $R_F$ and clamps the welding auxiliary joining part 2 at the component B. After having removed the element nest 30 from the clamped welding auxiliary joining part 2 (see FIG. 12), the setting welding process is carried out.

It follows from the above explanations that the mode of operation and cycle time of existing setting welding devices can be improved both with the element providing apparatus 3 and with the element nest 30 alone or in combination. Furthermore, the effort for drive technology and sensor technology may be reduced by that. Therefore, the present disclosure also comprises a retrofit kit with an element providing apparatus 3 and/or the element nest 30 for existing setting welding devices. Furthermore, the present disclosure similarly comprises a setting welding device 1 with the above-described element supply apparatus 3 alone or in combination with the element nest 30 or with the element nest 30 alone.

Figure 13:
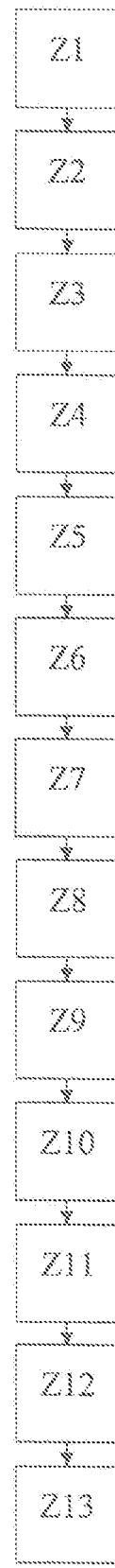

With respect to the flow chart in FIG. 13, the supply method of the welding auxiliary joining part 2 to the joining location in the setting welding device 1 with the above-described element supply apparatus 3 can be summarized with the following steps. First of all, in step Z1, a delivering of the occupied element nest 30 takes place with the linear movement of the linear drive 10 in the first movement direction $R_{10}$ at least to a joining location of the welding auxiliary joining part 2, with the welding auxiliary joining part 2 being releasably held by the two element jaws 33 of the element nest 30 that are arranged opposite to each other and in a springing way relative to each other. In step Z2, the downholder 40 which is fastened at the linear drive 10 rests at the at least one component B. Subsequently, in step Z3, the element nest 30 moves through the mechanical, direction-changing coupling component 20 into the second movement direction $R_{30}$ for the positioning of the welding auxiliary joining part at the joining location by means of a further moving (step Z4) of the linear drive 10 in the first movement direction $R_{10}$.

In step Z5, a moving of the element nest 30 up against or into abutment with the electrode punch S may take place, which causes the mechanical stop alignment of the element nest 30 abutting laterally at the electrode punch S and the welding auxiliary joining part 2 which is held between the element jaws 33 being positioned in the joining direction $R_F$ below the electrode punch S.

In the subsequent step Z6, the welding auxiliary joining part 2 is clamped at the joining location by the electrode punch S in the joining direction $R_F$ against the adjacent component B and in the next step Z7, the element nest 33 is removed from the electrode punch S. Thereby, a releasing (step Z8) of the welding auxiliary joining part 2 from the springing hold of the element jaws 33 also takes place.

As has already been described above, besides the delivering of the welding auxiliary joining part 2 to the joining location, the element supply method is also used for taking up a welding auxiliary joining part at the providing unit 7.

In a step Z9 a moving of the element nest 30 parallel to the first movement direction $R_{10}$ of the linear drive 10 adjacent to the providing unit or transfer unit 7 for a welding auxiliary joining part may be blocked. In this way, the element nest 30 is moved (step Z10) by the mechanical direction-changing coupling component 20 into the second movement direction $R_{30}$ into the direction of the providing unit 7. This movement serves for the positioning of the element nest 30 at the providing unit 7 by the further moving of the linear drive 10 in the first movement direction $R_{10}$.

With a subsequent step Z11, the element nest 30 is moved up against or into abutment with the providing unit 7. The mechanical stop alignment of the element nest, in particular the contour piece 34 with its abutment contour face 35, is driven to full contact to the stop 50 of the providing unit 7 and abuts there. In this way, the two element jaws 33 that are arranged in a springing manner relative to each other are positioned in a transfer position of the providing unit 7 in order to receive the welding auxiliary joining part 2. Subsequently, in step Z12, the welding auxiliary joining part 2 is moved out from the providing unit 7 between the element jaws 33 of the element nest 30 so that the welding auxiliary joining part 2 is releasably held there.

Finally, at a blocked movement of the element nest 30 parallel to the first movement direction $R_{10}$, the linear drive 10 is moved contrary to the first movement direction $R_{10}$, which causes the element nest 30 to being positioned back into an initial position via the mechanical, direction-changing coupling component 20 contrary to the second movement direction $R_{30}$. After conclusion of the positioning-back, the occupied element nest 30 is delivered (step Z13) to the joining location with the linear movement of the linear drive 10 in the first movement direction $R_{10}$.

Figure 14:
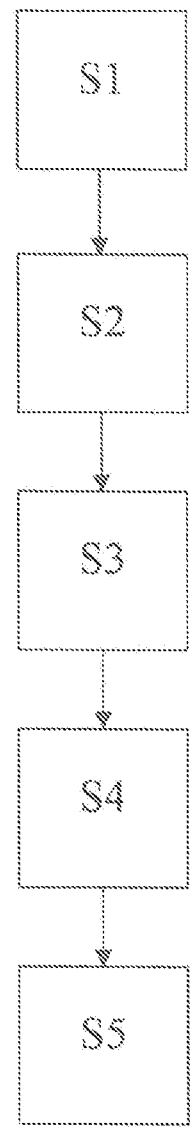

If the setting welding device is only equipped in combination with the above described element nest 30, the supply method of the welding auxiliary joining part to the joining location can be summarized with the following steps under reference to the flow chart in FIG. 14. Firstly, in a first step S1, a delivering of the occupied element nest 30 with the at least one drive 10 to the joining location adjacent to the electrode punch S takes place, with the welding auxiliary joining part 2 being releasably held by the two element jaws 33 of the element nest that are arranged opposite to each other and spring relative to each other. In a further step (S2), the element nest 30 is moved up against or into abutment with the electrode punch S, which causes the mechanical stop alignment of the element nest 30, i.e. the contour piece 34 with the abutment contour face 35, abutting laterally at the electrode punch S and the welding auxiliary joining part which is held between the element jaws 33 being positioned in the joining direction $R_F$ below the electrode punch S.

Alternatively to this step, firstly, the element nest 30 with the welding auxiliary joining part 2 held therein may be positioned adjacent to the joining location, which may be adjacent to the counter electrode E on the component. Subsequently, the electrode punch S is then moved in joining direction $R_F$ until abutment of the contour piece 34 with the abutment contour face 35 at the outside of the electrode punch S. In this way, due to the floating support of the welding auxiliary joining part 2 in the element nest 30, too, the welding auxiliary joining part 2 is fittingly positioned under the electrode punch S.

Subsequently, such as in step S3, a clamping of the welding auxiliary joining part 2 by the electrode punch S in the joining direction $R_F$ against the adjacent component B takes place at the joining location and in step S4, a removing of the element nest 30 from the electrode punch S and thereby a releasing of the welding auxiliary joining part 2 from the springing hold of the element jaws 33 takes place.

In the course of the two above-described positioning possibilities of the welding auxiliary joining parts 2 below the electrode punch S, a compensation of tolerances in a plane approximately perpendicular to the joining direction $R_F$ between the electrode punch S and the element nest 30 thus takes place in a subsequent step S5 when moving the element nest 30 up against or into abutment with the electrode punch S with the help of the floating support of the element nest 30 with respect to its fastening to the element supply apparatus.

The invention claimed is:

1. An element nest of a welding auxiliary joining part with a head and a shaft, wherein the element nest is configured for use in a setting welding device having an electrode punch, wherein
   the element nest comprises two element jaws that are arranged opposite to each other and spring relative to each other, with which the welding auxiliary joining part is releasably holdable and which are supported in a floating manner in a plane perpendicular to a joining direction of the setting welding device,
   as a mechanical stop alignment, the element nest comprises a contour piece with an abutment contour face that is adapted to an outer shape of the electrode punch, and
   the element jaws of the element nest are laterally fastened at the contour piece in a springy manner and the contour piece is arranged in a springingly, deflectable manner in at least two directions within a plane perpendicularly to the joining direction, wherein
   the element nest is supported in a plane approximately perpendicular to the joining direction of the setting welding device in a floating manner, in order to be positionable via the mechanical stop alignment in abutment with the electrode punch of the setting welding device in the joining direction below the electrode punch.

2. A setting welding device for a welding auxiliary joining part with a head and a shaft in combination with an element nest according to claim 1.

3. A retrofit kit comprising an element nest according to claim 1 which is connectable with a setting welding device.

* * * * *